US012229100B2

(12) United States Patent
Moran et al.

(10) Patent No.: US 12,229,100 B2
(45) Date of Patent: Feb. 18, 2025

(54) SYSTEMS AND METHODS FOR COUNTERACTING DATA-SKEWNESS FOR LOCALITY SENSITIVE HASHING VIA FEATURE SELECTION AND PRUNING

(71) Applicant: JPMORGAN CHASE BANK, N.A., New York, NY (US)

(72) Inventors: Sean Moran, Putney (GB); Fanny Silavong, London (GB); Rob Otter, Witham (GB); Antonios Georgiadis, London (GB); Brett Sanford, Tunbridge Wells (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/486,103

(22) Filed: Sep. 27, 2021

(65) Prior Publication Data

US 2022/0100725 A1 Mar. 31, 2022

(51) Int. Cl.
*G06F 16/9535* (2019.01)
*G06F 16/22* (2019.01)
(Continued)

(52) U.S. Cl.
CPC ...... *G06F 16/2255* (2019.01); *G06F 16/2246* (2019.01); *G06F 16/24578* (2019.01)

(58) Field of Classification Search
CPC ............. G06F 16/2255; G06F 16/2246; G06F 16/24578; G06F 16/2458
See application file for complete search history.

(56) References Cited

U.S. PATENT DOCUMENTS 9,009,149 B2 * 4/2015 He .................... G06F 16/24578
713/180
10,013,438 B2 * 7/2018 Badoiu ................ G06F 16/532
(Continued)

OTHER PUBLICATIONS

Ghanbarpour (Non Patent Literature: Journal of Universal Computer Science, vol. 25, No. 4 (2019), Survey on Ranking Functions in Keyword Search over Graph-Structured Data. 361-389 submitted: Apr. 20, 18, accepted: Apr. 15, 19, appeared: Apr. 28, 19 ã J.UCS A1). (Year: 2019).*

*Primary Examiner* — Apu M Mofiz
*Assistant Examiner* — Oscar Wehovz
(74) *Attorney, Agent, or Firm* — GREENBERG TRAURIG LLP

(57) ABSTRACT

Systems and methods for counteracting data-skewness for locality sensitive hashing via feature selection and pruning are disclosed. In one embodiment, a method for feature selection for counteracting data skewness on locality sensitive hashing (LSH)-based search may include: (1) ingesting, by an ingestion computer program and from a plurality of data sources, data; (2) extracting, by the ingestion computer program, a plurality of features from the ingested data; (3) transforming, by the ingestion computer program, each of the plurality of features into a feature vector; (4) selecting, by the ingestion computer program, a subset of the plurality of features; and (5) for each selected feature vector: computing, by the ingestion computer program, a random hash function for the selected feature; and inserting, by the ingestion computer program, an output of the random hash function into a hash table with the selected feature.

18 Claims, 4 Drawing Sheets

(51) Int. Cl.
    *G06F 16/2457*     (2019.01)
    *G06F 16/951*     (2019.01)

(56) References Cited

U.S. PATENT DOCUMENTS

| | | | |
|---|---|---|---|
| 11,061,652 B1* | 7/2021 | Biswas | G06F 8/427 |
| 11,238,104 B2* | 2/2022 | Barouni Ebrahimi | G06F 16/3347 |
| 2018/0246943 A1* | 8/2018 | Avagyan | G06F 16/29 |
| 2019/0034475 A1* | 1/2019 | Parikh | G06F 16/2255 |
| 2019/0171665 A1* | 6/2019 | Navlakha | G06F 16/538 |
| 2020/0076841 A1* | 3/2020 | Hajimirsadeghi | G06N 3/0454 |

* cited by examiner

SYSTEMS AND METHODS FOR COUNTERACTING DATA-SKEWNESS FOR LOCALITY SENSITIVE HASHING VIA FEATURE SELECTION AND PRUNING

RELATED APPLICATIONS

This application claims priority to, and the benefit of, Greek Patent Application Ser. No. 20200100589, filed Sep. 28, 2020, the disclosure of which is hereby incorporated, by reference, in its entirety.

BACKGROUND OF THE INVENTION

1. Field of the Invention

Embodiments relate generally to systems and methods for counteracting data-skewness for locality sensitive hashing via feature selection and pruning.

2. Description of the Related Art

Similarity search is a fundamental building block for numerous applications especially in the field of data mining and information retrieval. Computing the exact similarity between a query point and other points within the data suffers from scalability issue, where the time and space complexity increases as the data grows. To solve this problem, researchers have been focusing on approximate similarity such as Locality Sensitive Hashing (LSH) and proposed variants of LSH.

Empirical data often follows skewed distributions. For example, in the search engine context, a user query is significant shorter than the underlying documents or web pages the user is interested in retrieving. Various featurization techniques, such as the well-known Term Frequency-Inverse Document Frequency (TF-IDF), have been used to select relevant features and counter such skewness within the features. These approaches, however, are only used for exact similarity search which has significant scalability limitations.

SUMMARY OF THE INVENTION

Systems and methods for counteracting data-skewness for locality sensitive hashing via feature selection and pruning are disclosed. In one embodiment, a method for feature selection for counteracting data skewness on locality sensitive hashing (LSH)-based search may include: (1) ingesting, by an ingestion computer program and from a plurality of data sources, data; (2) extracting, by the ingestion computer program, a plurality of features from the ingested data; (3) transforming, by the ingestion computer program, each of the plurality of features into a feature vector; (4) selecting, by the ingestion computer program, a subset of the plurality of features; and (5) for each selected feature vector: computing, by the ingestion computer program, a random hash function for the selected feature; and inserting, by the ingestion computer program, an output of the random hash function into a hash table with the selected feature.

In one embodiment, the method may further include scoring, by the ingestion computer program and using a scoring method, each of the feature vectors, wherein the ingestion computer program may select the subset of the features based on the scoring of the feature vectors.

In one embodiment, the scoring method may include Inverse Leaf Frequency (ILF) and/or Normalized Sub-Path Frequency (NSPF).

In one embodiment, the ingestion computer program may transform each of the selected features using a normalized frequency, a term frequency, inverse document frequency (TF-IDF), a term frequency (TF) squashed by a logarithm score, and/or a count-based score computed with respect to node relationships defined by a tree structure.

In one embodiment, the method may further include identifying, by the ingestion computer program, one of the selected features that has a length that is smaller than a fixed length and padding, by the ingestion computer program, the feature to the fixed length using a position dependent string or a random string.

In one embodiment, the method may further include ranking, by the ingestion computer program, the outputs of the random hash function by selecting features having a highest ranking, removing the features having a highest ranking and features having a lowest ranking, and/or selecting features in a middle percentile based on a Gaussian distribution on the features.

According to another embodiment, a method for locality sensitive hashing (LSH)-based searching may include: (1) receiving, by a search computer program, a query; (2) extracting, by the search computer program, a plurality of query features from the query; (3) computing, by the search computer program, an output of a first random hash function for each of the query features; (4) identifying, by the search computer program and in a hash table comprising a plurality of inserted features, each inserted feature associated with a inserted output of a second random hash function, the plurality of the inserted features having stored outputs based on a comparison of the outputs of the first random hash function to the inserted outputs; and (5) outputting, by the search computer program, the identified inserted features.

In one embodiment, the method may further include transforming, by the search computer program, each of the query features into a query feature vector.

In one embodiment, the method may further include scoring, by the search computer program and using a scoring method, each of the query feature vectors, and selecting, by the search computer program, a subset of the query features based on the scoring of the query feature vectors. The search computer program may compute the outputs of a first random hash function on each of the subset of query features.

In one embodiment, the scoring method may include Inverse Leaf Frequency (ILF) and/or Normalized Sub-Path Frequency (NSPF).

In one embodiment, the method may further include ranking, by the search computer program, identified stored features using an exact similarity comparison between a stored feature vector for each of the identified stored features and the query feature vectors.

In one embodiment, the features may include term features.

In one embodiment, the query may be for Java source code.

In one embodiment, the first random hash function may include a Minhash method.

According to another embodiment, an electronic device may include a memory storing an ingestion computer program and a computer processor. When executed by the computer processor, the ingestion computer program may the computer processor to: ingest data from a plurality of data sources; extract a plurality of features from the ingested data; transform each of the plurality of features into a feature vector; select a subset of the plurality of features; and for each selected feature vector: compute a first random hash function for the selected feature and insert an output of the first random hash function into a hash table with the selected feature.

In one embodiment, the ingestion computer program may further cause the computer processor to score, using a scoring method, each of the feature vectors and to select the subset of the plurality of features based on the scoring of the feature vectors, wherein the scoring method comprises Inverse Leaf Frequency (ILF) and/or Normalized Sub-Path Frequency (NSPF).

In one embodiment, the ingestion computer program may further cause the computer processor to transform each of the selected features using a normalized frequency, a term frequency, inverse document frequency (TF-IDF), a term frequency (TF) squashed by a logarithm score, and/or a count-based score computed with respect to node relationships defined by a tree structure.

In one embodiment, the ingestion computer program may further cause the computer processor to rank the outputs of the first random hash function by selecting features having a highest ranking, removing the features having a highest ranking and features having a lowest ranking, and/or selecting features in a middle percentile based on a Gaussian distribution on the features.

In one embodiment, the memory may also include a search computer program, and the search computer program causes the computer processor to: receive a query; extract a plurality of query features from the query; compute an output of a second random hash function for each of the query features; identify, in the hash table, a plurality of the inserted features having inserted outputs based on a comparison of the outputs of the second random hash function to the stored outputs; and output the identified inserted features.

In one embodiment, the search computer program may further cause the computer processor to transform each of the query features into a query feature vector.

In one embodiment, the search computer program may further cause the computer processor to score, using a scoring method, each of the query feature vectors, and select a subset of the query features based on the scoring of the query feature vectors, wherein the search computer program computes the outputs of the second random hash function on each of the subset of query features, wherein the scoring method comprises Inverse Leaf Frequency (ILF) and/or Normalized Sub-Path Frequency (NSPF), and ranks the identified stored features using an exact similarity comparison between a stored feature vector for each of the identified stored features and the query feature vectors.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate generally to systems and methods for counteracting data-skewness for locality sensitive hashing via feature selection and pruning.

Figure 1:
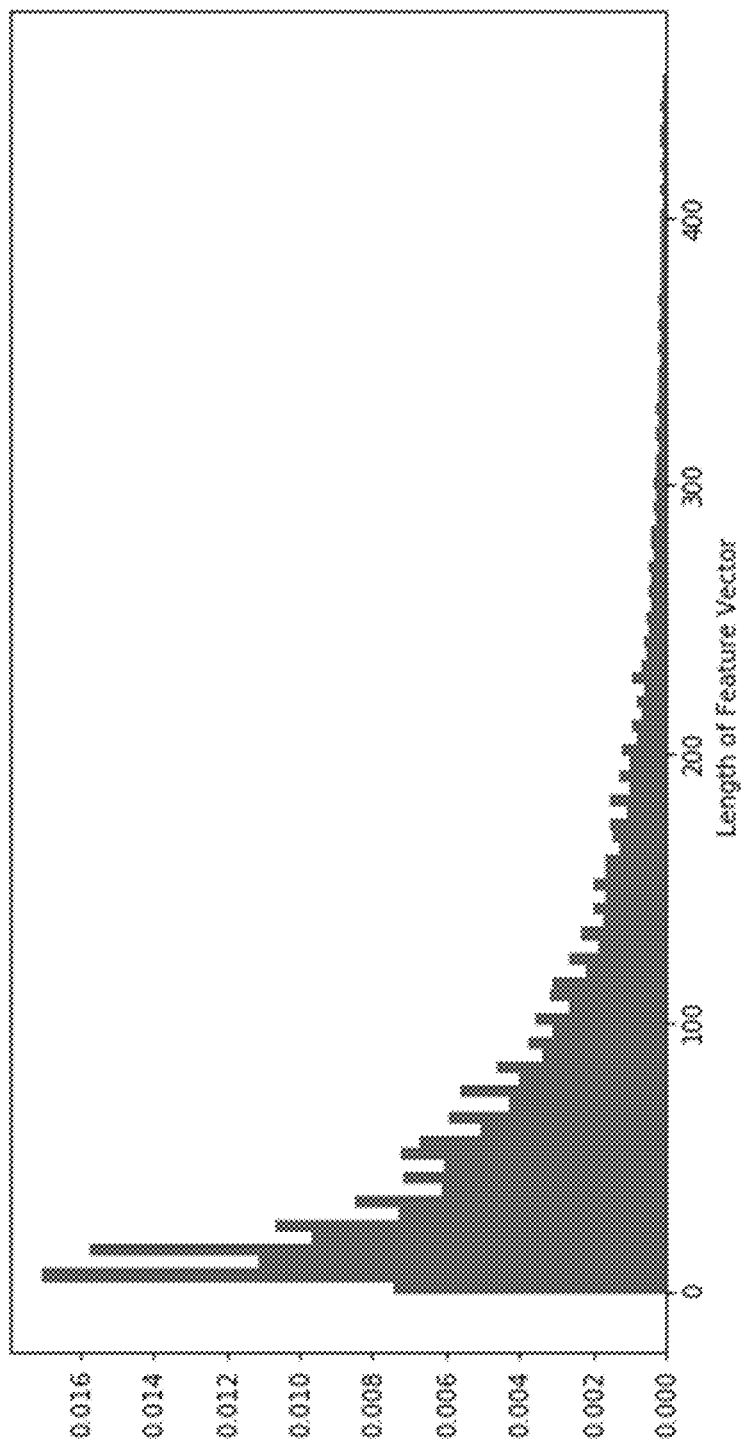
FIG. 1 illustrates an example of the skewed distributions observed in the domain of source code retrieval.

The skewed distribution of data often introduces biases into the similarity measures and negatively impacts the search results. Featurization techniques, such as feature selection, have the ability to counter such bias in a meaningful manner where is are minimized. For example, FIG. 1 illustrates the skewed distributions observed in the domain of source code retrieval. The length of the feature vector that represents the source code is positively skewed and results in bias towards data-points of certain lengths depending on the similarity measure used.

Embodiments are directed to a new method for search that only compares to a subset of the data-points very likely to be similar (using LSH) to the query while also counteracting the bias caused by skewness.

Embodiments may use a novel algorithm, De-Skew LSH, to leverage feature selection and pruning techniques to counter the data skewness for Locality Sensitive Hashing. According to an embodiment, for a length L and r records, with L having a maximum length (maxlength), a LSH family F with the width parameter k and a number of hash tables H, a family of hash functions G and a Hash Table T, where $h_k \sim F$ and $g_r \sim G$: For each record, first extract the relevant features (e.g., tokenization), apply feature transformation (e.g., normalization), select the most discriminative features from the set, and pad the features so that they have the maxlength. Then, for each of H hashtables: generate K randomly chosen hash functions from F, apply the K hash functions to each feature to generate the hashtable bucket key for each feature, and then insert the features into the hashtable buckets indicated by the keys.

For example, a fixed set of relevant features may be maintained, and an asymmetric transformation may be applied to the query and data prior to applying hash functions and building of the LSH index. LSH may then group similar data into the same bucket based on the hash collisions, such that the probability of collision only depends on relevant features. The algorithm may be agnostic to the chosen featurization techniques.

Figure 2:
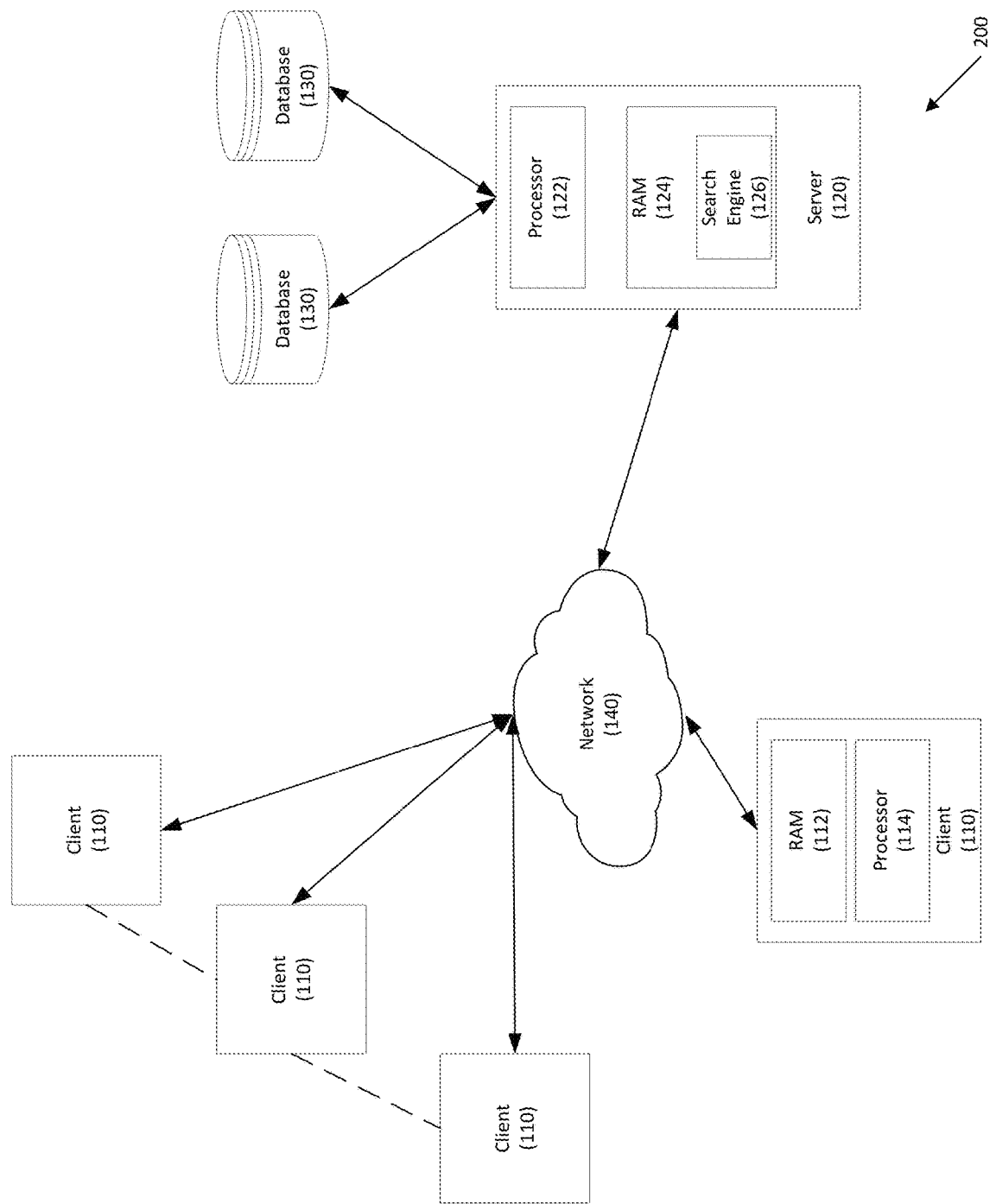
FIG. 2 depicts a system for counteracting data-skewness for locality sensitive hashing via feature selection and pruning according to an embodiment.

Referring to FIG. 2, a system for counteracting data-skewness for locality sensitive hashing via feature selection and pruning is disclosed according to an embodiment. System 200 may include a plurality of clients 210. Each client may execute on an electronic device include memory 212 and at least one computer processor 214. Any suitable electronic device may be used, including, for example, computers (e.g., workstations, desktops, laptops, tablet, etc.), smart devices (e.g., smart phones), Internet of Things (IoT) devices, kiosks, terminals, etc.

Each client 210 may interface with network 240, which may be any suitable communication network or a combination of networks including, for example, intranets, local area networks, wide area networks, the Internet, etc. For example, client 210 may submit a query to server 220 via network 240, and may receive results via network 240.

Server 220 may include one or more processor 222 and memory 224. Memory 224 may store instructions for search computer program 226, which may process the query from client 210 via network 240 and query database(s) 230, which may be indexed databases. For example, search computer program 226 may compute a similarity between the query and the data in database(s) 230. Search computer program 226 may then return the results of the query to client 210 via network 240.

Memory 224 may further store instructions for ingestion program 228, which may ingest data from database(s) 230, extract features from the ingested data, transform the extracted features, select certain transformed features, compute random hash functions for the extracted features, and insert the computed random hash functions into a hash table.

Figure 3:
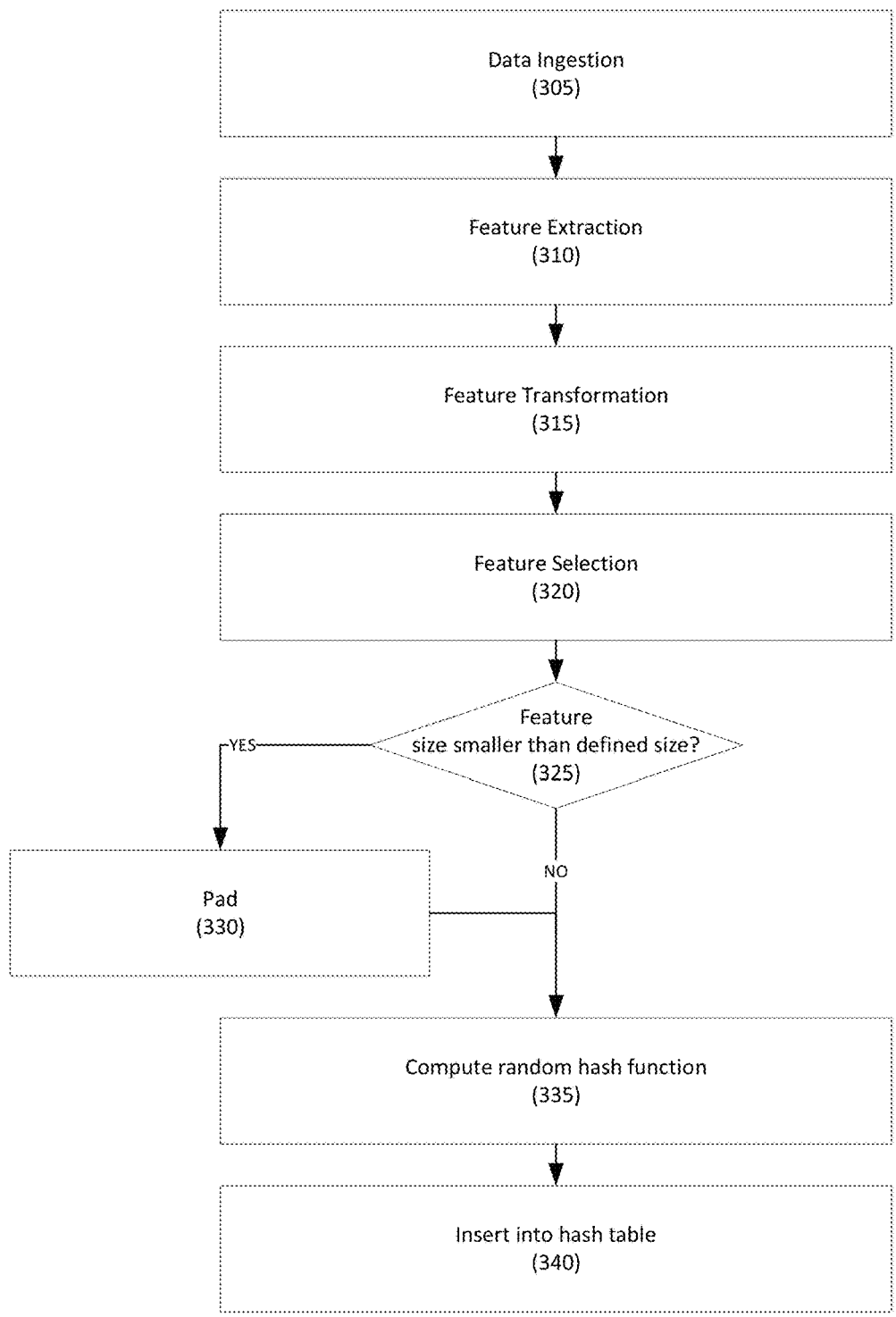
FIG. 3 depicts a method for counteracting data-skewness for locality sensitive hashing via feature selection and pruning according to an embodiment.

Referring to FIG. 3, an exemplary process flow for ingesting data and generating hash tables is provided. In step 305, an ingestion computer program executed on a server may ingest data from a plurality of data sources. Examples of data may include source code, new stories, documents, etc. Any suitable data may be processed as is necessary and/or desired.

In step 310, the ingestion computer program may extract features from the ingested data. In one embodiment, features that represent the meaning of data may be extracted. For example, given an abstract syntax tree, tree-based features, such as the node itself (e.g., a variable), its parent node (e.g., a variable assignment), and its sibling nodes (e.g., non-keyword tokens) may be extracted, and a vocabulary of the extracted features may be built. Each feature may then be represented by its index in the vocabulary.

Tokens may be extracted from the ingested data via standard tokenization techniques.

In step 315, the ingestion computer program may transform the extracted features into feature vectors. Example algorithms for such transformations include TF-IDF, Bag-of-Word, distributional representation (e.g., Code2Vec).

In step 320, the feature vectors may be scored. In one embodiment, a scoring method, such as Inverse Leaf Frequency (ILF), Normalized Sub-Path Frequency (NSPF), combinations, etc. may be used. The scoring method may return a number that represents the importance of the features, and that number may be used to select a subset of the features for further processing.

In step 325, using the scoring for the feature vectors, the ingestion computer program may select a subset of the plurality of feature vectors. For example, features with feature vectors that distinguish the data point from the rest may be selected. An example method of selecting the features may include selecting the features with the top-k feature vectors with the highest value, and/or removing features with feature vectors with low variance.

In step 330, the ingestion computer program may optionally compare the size of the subset of features to a threshold. If the number of features is below the threshold, in step 335, the ingestion computer program may apply padding to selected features to correct the skewness in the size of features. The threshold may be determined by heuristics, model results, user-defined, etc. For example, it can be the median of feature set size.

In step 340, the ingestion computer program may compute one or more random hash functions one each of the subset of features, padded or otherwise. For example, a family of hash functions may be defined, and a randomly chosen subset may be concatenated n times, where n is the number of hash tables. An example of a suitable hash function includes SHA256.

In step 345, the ingestion computer program may insert the features, their feature vectors, and their random hash functions into a hash table or bucket. For example, the computed signature from the output of the hash function computation may be inserted into a corresponding hash table or bucket.

Figure 4:
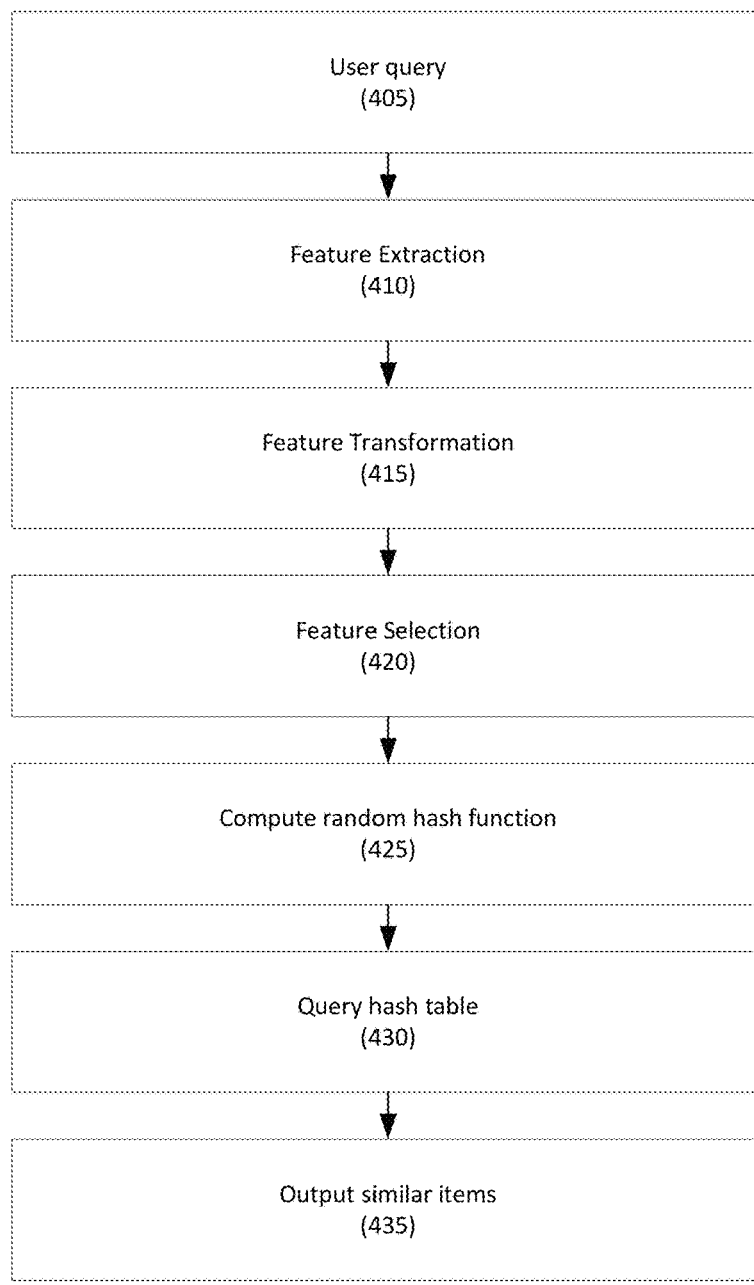
FIG. 4 depicts a method for querying hash table/buckets according to an embodiment.

Referring to FIG. 4, a method for querying hash table/buckets is disclosed according to an embodiment.

In step 405, a search computer program executed by a server may receive a query from a user. For example, for natural language-based data, the query may be a sentence; for sourcecode-based data, the query may be for part of a function, a method, or a class in sourcecode.

In step 410, the search engine may extract query features from the query. This may be similar to step 310, above.

In step 415, the search engine may transform the extracted query features into query feature vectors. This may be similar to step 315, above.

In optional step 420, the query feature vectors may be scored. This may be similar to step 320, above.

In optional step 425, the search engine may select a subset of the query features based on the feature vector scores. This may be similar to step 325, above. In one embodiment, a certain number query features that have the query feature vectors with highest normalized frequency of the code may be selected. For example, three query features may be selected; it should be recognized that this is exemplary only and a greater or fewer number of query features may be selected as is necessary and/or desired.

In step 430, the search engine may compute one or more random hash functions for each of the selected query features. In one embodiment, the hash functions may be the same type of hash function as in the ingestion process (e.g., step 340) but may be a different random instantiation of the hash function.

In step 435, using the output of the random hash function, the search engine may retrieve stored features from the hash tables/buckets generated in FIG. 3.

In step 440, the retrieved features may be ranked and scored, for example, by performing an exact similarity comparison between the retrieved features from the hash table or bucket and the query features. For example, the feature vectors for the retrieved features and the query feature vectors may be compared and ranked. Examples of similarity comparison computations include cosine similarity, Jaccard similarity, containment (overlapping) score, etc.

In step 445, the search engine may return the results of the query. Embodiments may provide at least some of the following: (1) better matching of variable length queries, applicable to many domains; (2) similarity search (e.g., documents, source code, internal knowledgebase, etc.); (3) information retrieval (e.g., news articles querying, event alert generation, etc.); (4) duplicate and near-duplicate detection (e.g., summarization algorithms, database cleaning, plagiarism detection, etc.).

Embodiments may be applicable to multiple industries, including, for example, banking, insurance, legal, medical, hedge funds, media. etc. Example application may include internal and external search engines, chatbots, news article querying, fraud detection, code recommendation tools, intranet searching, efficiency gains through faster and more accurate searching, code-to-code recommendation for searching codebases, etc.

Embodiments may enable almost real-time search with high accuracy. For example, embodiments may achieve a 90% reduction in query time versus a brute-force search and on a source code database, and a 6% increase in relevance to human judgements.

Embodiments do not require an expensive CPU/GPU, computational hardware or stack (Hadoop clusters etc.). For example, embodiments may be executed on smart devices (e.g., smart phones), portable electronic devices, etc.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for feature selection for counteracting data skewness in locality sensitive hashing (LSH)-based searches, comprising:
    ingesting, by an ingestion computer program and from a plurality of data sources, data comprising an abstract syntax tree;
    extracting, by the ingestion computer program, a plurality of tree-based features from the abstract syntax tree;
    transforming, by the ingestion computer program, each of the plurality of tree-based features into a feature vector;
    scoring, by the ingestion computer program and using a scoring method, each of the feature vectors, wherein the scoring method comprises Normalized Sub-Path Frequency (NSPF);
    selecting, by the ingestion computer program, a subset of the plurality of feature vectors by selecting the feature vectors with a highest score and/or not selecting feature vectors with low variance; and
    for each selected feature vector:
        padding, by the ingestion computer program, the selected feature vector to a fixed length;
        computing, by the ingestion computer program, a random hash function for the selected padded feature vector; and
        inserting, by the ingestion computer program, an output of the random hash function into a hash table with the selected padded feature vector.

2. The method of claim 1, wherein the scoring method comprises Inverse Leaf Frequency (ILF).

3. The method of claim 1, wherein the ingestion computer program transforms each of the selected features using a normalized frequency, a term frequency, inverse document frequency (TF-IDF), a term frequency (TF) squashed by a logarithm score, and/or a count-based score computed with respect to node relationships defined by a tree structure.

4. The method of claim 1, further comprising:
    ranking, by the ingestion computer program, the outputs of the random hash function by selecting features having a highest ranking, removing the features having a highest ranking and features having a lowest ranking, and/or selecting features in a middle percentile based on a Gaussian distribution on the features.

5. A method for locality sensitive hashing (LSH)-based searching, comprising:
    receiving, by a search computer program, a query, wherein the query comprises an abstract syntax tree;
    extracting, by the search computer program, a plurality of query features from the query, wherein the features are tree-based features;
    transforming, by the search computer program, each of the query features into a query feature vector;
    scoring, by the search computer program and using a scoring method, each of the query feature vectors, wherein the scoring method comprises Normalized Sub-Path Frequency (NSPF);

selecting, by the search computer program, a subset of the query features based on the scoring of the query feature vectors;

computing, by the search computer program, an output of a first random hash function for each of the query tree-based feature vectors;

identifying, by the search computer program and in a hash table comprising a plurality of inserted padded feature vectors, each inserted padded feature vector associated with an inserted output of a second random hash function, the plurality of the inserted padded feature vectors having stored outputs based on a comparison of the outputs of the first random hash function to the inserted outputs; and outputting, by the search computer program, the identified inserted padded feature vectors;

wherein the search computer program computes the outputs of a first random hash function on each of the subset of query features.

6. The method of claim 5, further comprising:

ranking, by the search computer program, identified stored features using an exact similarity comparison between a stored feature vector for each of the identified stored features and the query feature vectors.

7. The method of claim 5, wherein the query is for Java source code.

8. The method of claim 5, wherein the first random hash function comprises a Minhash method.

9. An electronic device, comprising:

a memory storing an ingestion computer program; and a computer processor;

wherein, when executed by the computer processor, the ingestion computer program causes the computer processor to:

ingest data comprising an abstract syntax tree from a plurality of data sources;

extract a plurality of tree-based features from the ingested data;

transform each of the plurality of tree-based features into a feature vector;

scoring, using a scoring method, each of the feature vectors, wherein the scoring method comprises Normalized Sub-Path Frequency (NSPF);

select a subset of the plurality of feature vectors by selecting the feature vectors with a highest score and/or not selecting feature vectors with low variance; and for each selected feature vector: pad the selected feature vector to a fixed length, compute a first random hash function for the selected padded feature vector, and insert an output of the first random hash function into a hash table with the selected padded feature vector.

10. The electronic device of claim 9, wherein the scoring method comprises Inverse Leaf Frequency (ILF) and/or Normalized Sub-Path Frequency (NSPF).

11. The electronic device of claim 9, wherein the ingestion computer program further causes the computer processor to transform each of the selected features using a normalized frequency, a term frequency, inverse document frequency (TF-IDF), a term frequency (TF) squashed by a logarithm score, and/or a count-based score computed with respect to node relationships defined by a tree structure.

12. The electronic device of claim 9, wherein the ingestion computer program further causes the computer processor to rank the outputs of the first random hash function by selecting features having a highest ranking, removing the features having a highest ranking and features having a lowest ranking, and/or selecting features in a middle percentile based on a Gaussian distribution on the features.

13. The electronic device of claim 9, wherein the memory further comprises a search computer program, and the search computer program causes the computer processor to:

receive a query;

extract a plurality of query features from the query;

compute an output of a second random hash function for each of the query features;

identify, in the hash table, a plurality of the inserted features having inserted outputs based on a comparison of the outputs of the second random hash function to the stored outputs; and output the identified inserted features.

14. The electronic device of claim 13, wherein the search computer program further causes the computer processor to transform each of the query features into a query feature vector.

15. The electronic device of claim 14, wherein the search computer program further causes the computer processor to score, using a scoring method, each of the query feature vectors, and select a subset of the query features based on the scoring of the query feature vectors, wherein the search computer program computes the outputs of the second random hash function on each of the subset of query features, wherein the scoring method comprises Inverse Leaf Frequency (ILF) and/or Normalized Sub-Path Frequency (NSPF), and ranks the identified stored features using an exact similarity comparison between a stored feature vector for each of the identified stored features and the query feature vectors.

16. The method of claim 1, wherein the tree-based features comprise nodes, parent nodes, and sibling nodes.

17. The method of claim 5, wherein the tree-based features comprise nodes, parent nodes, and sibling nodes.

18. The electronic device of claim 9, wherein the tree-based features comprise nodes, parent nodes, and sibling nodes.

* * * * *